United States Patent [19]

Heaton et al.

[11] Patent Number: 5,544,323
[45] Date of Patent: Aug. 6, 1996

[54] HIGH BIT RATE ETHERNET CONNECTION

[75] Inventors: Robert Heaton, Laguna Niguel; Nariman Yousefi; Khosrow Sadeghi, both of Irvine; David Fischer, Santa Ana, all of Calif.

[73] Assignee: Standard Microsystems Corp., Hauppauge, N.Y.

[21] Appl. No.: 126,176

[22] Filed: Sep. 23, 1993

[51] Int. Cl.$^6$ .................................................. G06F 13/00
[52] U.S. Cl. ............. 395/200.14; 395/800; 364/DIG. 1; 364/242.94; 364/239.9
[58] Field of Search .................................. 395/200, 800, 395/200.15, 200.14; 370/24, 32, 85.3, 93, 94.3, 93.5, 24.32

[56] References Cited

U.S. PATENT DOCUMENTS

| | | | |
|---|---|---|---|
| 4,639,910 | 1/1987 | Toegel et al. | 370/58 |
| 4,740,992 | 4/1988 | Havens et al. | 375/7 |
| 4,780,814 | 10/1988 | Hayek | 395/325 |
| 4,809,361 | 2/1989 | Okada et al. | 455/606 |
| 4,864,303 | 9/1989 | Ofek | 341/95 |
| 5,189,414 | 2/1993 | Tawara | 340/825.5 |
| 5,434,861 | 7/1995 | Pritty et al. | 370/85.8 |

OTHER PUBLICATIONS

J. R. Rivers "PMD Prop. Util. Four Category 3 UTP Wirepairs, 5B6B Encoding and Low Freq. Coll. Det." IEEE 802.3 Higher Sp. Stud. Grp, Wakefield, MA, May 1993.

H. Johnson "CSMA/CD Using 2 or More Pairs" 802.3 Higher Speed Study Group, Wakefield, MA, May, 1993.

*Primary Examiner*—Mehmet B. Geckil
*Attorney, Agent, or Firm*—Meltzer, Lippe, Goldstein, et al.

[57] ABSTRACT

In a fast Ethernet, each station is connected to the hub by four unshielded twisted pairs. A first pair is transmit only for the station and receive only for the hub, a second pair is transmit only for the hub and receive only for the station, and the third and fourth pairs are bidirectional. Both the station and the hub use their transmit only and the bidirectional pairs for data transmission and their receive only pair for collision detection.

8 Claims, 4 Drawing Sheets

HIGH BIT RATE ETHERNET CONNECTION

FIELD OF THE INVENTION

The present invention relates to high bit rate data transmissions in a Local Area Network (LAN) such as an Ethernet. Specifically, in accordance with the present invention, each station in the LAN is connected to a hub by a plurality of unshielded twisted pairs. One pair transmits unidirectionally from the station to the hub, another pair transmits unidirectionally from the hub to the station, and the remainder of the pairs transmit bidirectionally between the station and the hub. The unidirectional pairs are used for collision detection in accordance with a CSMA/CD (Carrier Sense Multiple Access/Collision Detection) technique.

BACKGROUND OF THE INVENTION

A Local Area Network such as an Ethernet typically comprises a plurality of stations (also known as Data Terminal Equipments or DTE's) connected to a hub. In one conventional Ethernet arrangement known as 10 base T, a station and the hub are connected by two unshielded twisted pairs (UTP's). Each of the two pairs transmits unidirectionally. One of the two pairs is used by the station only to transmit data to the hub and is used by the hub only to receive data from the station. The other of the two pairs is used by the station only to receive data from the hub and is used by the hub only to transmit data to the station.

The 10 base T system uses a collision detection algorithm which operates as follows: A station detects the start of a collision by detecting energy (i.e. a carrier) on its receive only pair while the station is transmitting on its transmit only pair. The hub detects the start of a collision with a particular station by detecting the presence of energy on the receive only pair connected to the particular station while the hub is transmitting on the transmit only pair connected to the particular station.

After detecting the start of a collision, the station sends a jam signal for a specified time period on its transmit only pair and then goes quiet. After detecting the start of the collision, the hub sends a jam signal on the transmit only pair leading to each station connected to the hub. The hub keeps sending the jam signal on all its transmit only pairs until the hub detects no energy on any of its receive only pairs, then the hub goes quiet. Transmissions between the stations and the hub then resume in accordance with the conventional exponential backoff algorithm specified by the IEEE 802.3 Standard.

This collision detection algorithm is advantageous in many low bitrate situations because collision detection is simple and fast. All that is required by the station or hub to detect a collision is to detect energy on a receive only pair while a transmission is taking place.

The 10 base T Ethernet generally operates up to 10 Mbps. Recently efforts have been directed to increasing the speed of Ethernets to up to 100 mbps.

In one high speed Ethernet four unshielded twisted pairs are used to connect the hub to each station (see e.g. J. R. Rivers "PMD Proposal Utilizing Four Category 3 UTP Wirepairs, 5B6B Encoding and Low Frequency Collision Detection" IEEE 802.3 Higher Speed Study Group, Wakefield, Mass., May, 1993, and Howie Johnson "CSMA/CD Using 2 or More Pairs" 802.3 Higher Speed Study Group, Wakefield, Mass., May 1993). All four of the pairs are used bidirectionally to transmit data from the station to the hub and also to transmit data from the hub to the station. A collision is detected as follows: Consider the case where the station is transmitting data at a high frequency on all four pairs to the hub and then the hub starts to transmit on all four pairs. On one of the pairs the hub starts its transmission with a low frequency Start Of Carrier (SOC) signal. The station continuously monitors this pair. The difference between any signal received on this pair from the hub and the signal transmitted on this pair by the station is continuously obtained. The difference signal is then filtered by a low pass filter whose pass band corresponds to the frequency band of the SOC signal. Any energy in the SOC band will be detected by the station as a collision. Collision detection at the hub takes place in a similar manner. Consider the case where the hub is transmitting high frequency data on all four pairs: When the station starts transmitting, it sends a low frequency SOC signal on one particular pair, which particular pair is continuously monitored by the hub. The hub continuously obtains the difference between any signal received from the station on this particular pair and the data signal it is transmitting on this particular pair. The difference signal is filtered by a low pass filter whose pass band corresponds to the low frequency SOC signal. Any energy in the SOC band will be detected by the hub as a collision.

This technique for using multiple pairs between each station and the hub to achieve a fast Ethernet has significant shortcomings. Specifically, the collision detection technique is unsatisfactory because it is too slow and too complex. The need to obtain a difference signal and then filter the difference signal to detect a collision causes the time required to detect a collision to be too long, thereby degrading the performance of the entire network. The time required to detect a collision in the above described fast Ethernet technique is much longer than the time required to detect a collision in the 10 base T technique. Furthermore, in comparison to the 10 base T technique, the above described Fast Ethernet technique requires additional circuitry in the form of a hybrid to obtain the difference signal and a low pass filter to filter the difference signal.

In view of the foregoing, it is an object of the present invention to provide a fast Ethernet in which multiple pairs connect each station to the hub, but in which a simpler collision detection technique is utilized.

SUMMARY OF THE INVENTION

In accordance with an illustrative embodiment of the invention, a Local Area Network comprises a hub and one or more stations connected to the hub. Each station is connected to the hub by three or more transmission paths. Illustratively, each transmission path is an unshielded twisted pair. The station and hub are adapted so that a first pair is receive only for the station and transmit only for the hub. Thus, the station can only receive on the first pair and the hub can only transmit on the first pair. The station and hub are adapted so that a second pair is transmit only for the station and receive only for the hub. Thus, the station can only transmit on the second pair and the hub can only receive on the second pair. The hub and station are adapted so that on the remaining one or more pairs, data can be transmitted in both directions between the station and the hub.

Collision detection is very simple with this arrangement. In operation, a station detects the start of a collision by detecting the presence of energy on its receive only pair, while the station is transmitting on its other pairs. The hub detects the start of a collision with a particular station by detecting the presence of energy on the receive only pair connected to the particular station, while the hub is transmitting on the other pairs leading to that particular station. Illustratively, after detecting the start of a collision, the station sends a jam signal for a specified time period on its transmit only pair and then the station goes quiet. Illustratively, after detecting the start of a collision, the hub sends a jam signal to each station connected to the hub via the transmit only pair connected to each station. The hub keeps sending its jam signal to all the stations until the hub detects no energy on all its receive only pairs and then the hub goes quiet.

Transmissions between the stations and the hub then begin again according to a particular predetermined prioritization technique such as the exponential backoff algorithm of the IEEE 802.3 standard.

Illustratively, there are four unshielded twisted pairs connecting each station to the hub—one pair being receive only for the station and transmit only for the hub, a second pair being transmit only for the station and receive only for the hub, and two pairs being bidirectional. Thus, there are a total of three pairs available for transmission in each direction. To transmit data from a station to the hub, a single serial binary encoded bit stream is divided at the station into three parallel binary encoded bit streams. The binary encoded bit streams are then converted to ternary (three level coded) bit streams using, for example, a 7B/5T (seven binary bits to five ternary symbols) or, for example, an 8B/6T (eight binary bits to six ternary symbols) encoder. The ternary coding is used because only three, rather than four, twisted pairs are available to transmit data. In other words, the ternary coding represents a form of data compression so that the same data rate can be achieved with the inventive technique using three pairs for transmission as other techniques achieve using four pairs for transmission. The data is transmitted through the hub to one or more other stations in ternary form.

The inventive fast Ethernet arrangement has a number of significant advantages. These are as follows:

1. Collision detection is fast and simple. There is no need for complex circuitry for obtaining the difference signal between incoming and outgoing signals on a pair and for low pass filtering the difference signal to detect a start-of-carrier signal and, thus, detect a collision. Furthermore, there is no need to use a special low frequency preamble on one of the pairs at the start of a transmission because a collision is no longer detected by differentiating between a high frequency data signal and a low frequency preamble.

2. At each station only three transmitters and three receivers are required. Similarly, for each station connected to the hub, the hub requires only three transmitters and three receivers. In contrast, the other fast Ethernet techniques described above require four transmitters and four receivers at each station and a corresponding four receivers and four transmitters at the hub.

3. One pair between the hub and station is idle during transmission, the idle pair helping to reduce radio frequency emissions.

4. The number of preamble bits stays the same as 802.3. There is no need to lengthen the preamble to generate a low frequency preamble.

5. Three level signalling may be used to limit the bandwidth to below 30 Mhz. Three level signalling is more efficient than binary signalling.

DETAILED DESCRIPTION OF THE INVENTION

Figure 1:
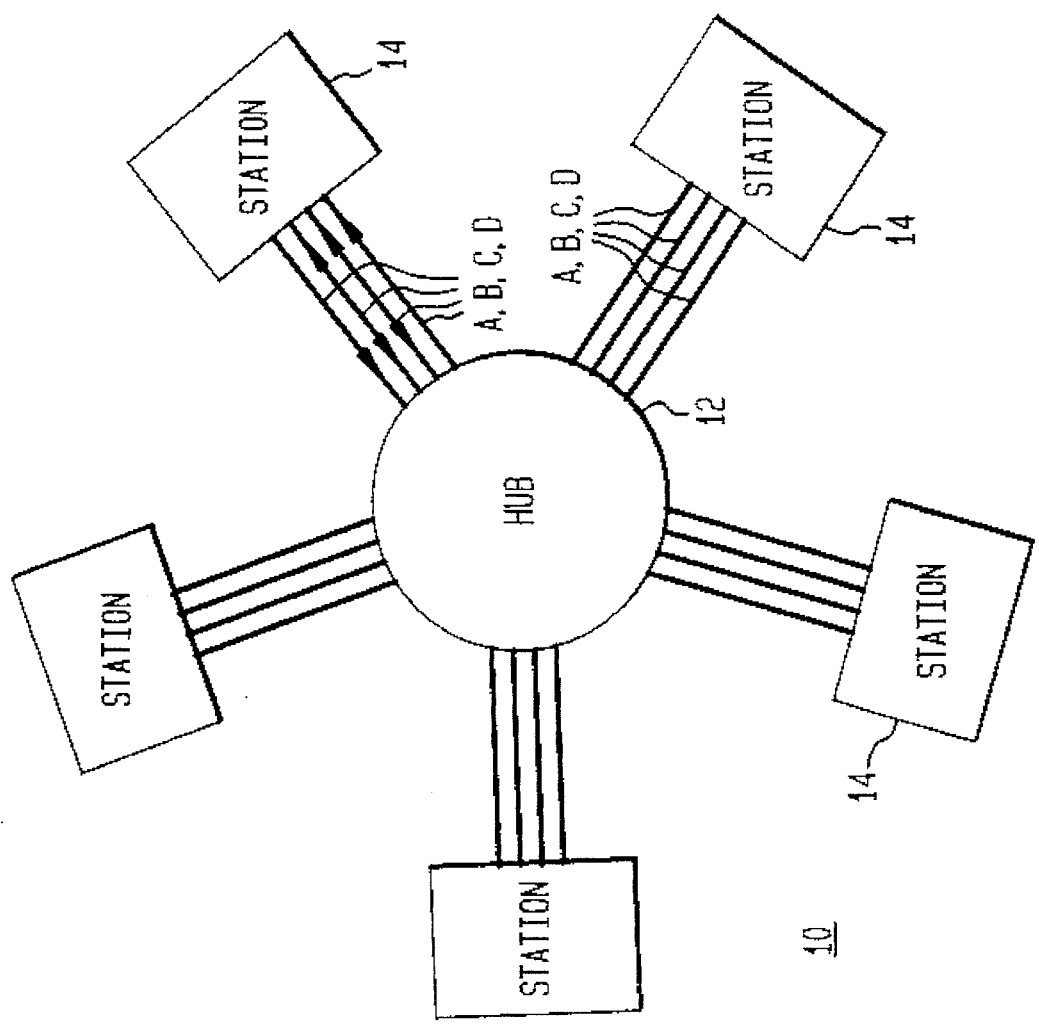
FIG. 1 schematically illustrates a fast Local Area Network such as an Ethernet in accordance with an illustrative embodiment of the invention.

FIG. 1 schematically illustrates a fast Ethernet 10 in accordance with an illustrative embodiment of the present invention. The network 10 comprises a hub 12 and a plurality of stations 14. Each station 14 is connected to the hub 12 by four transmission paths A, B, C, D. Each transmission path is formed by a voice grade, unshielded, twisted pair, such as CAT 3 UTP.

Figure 2:
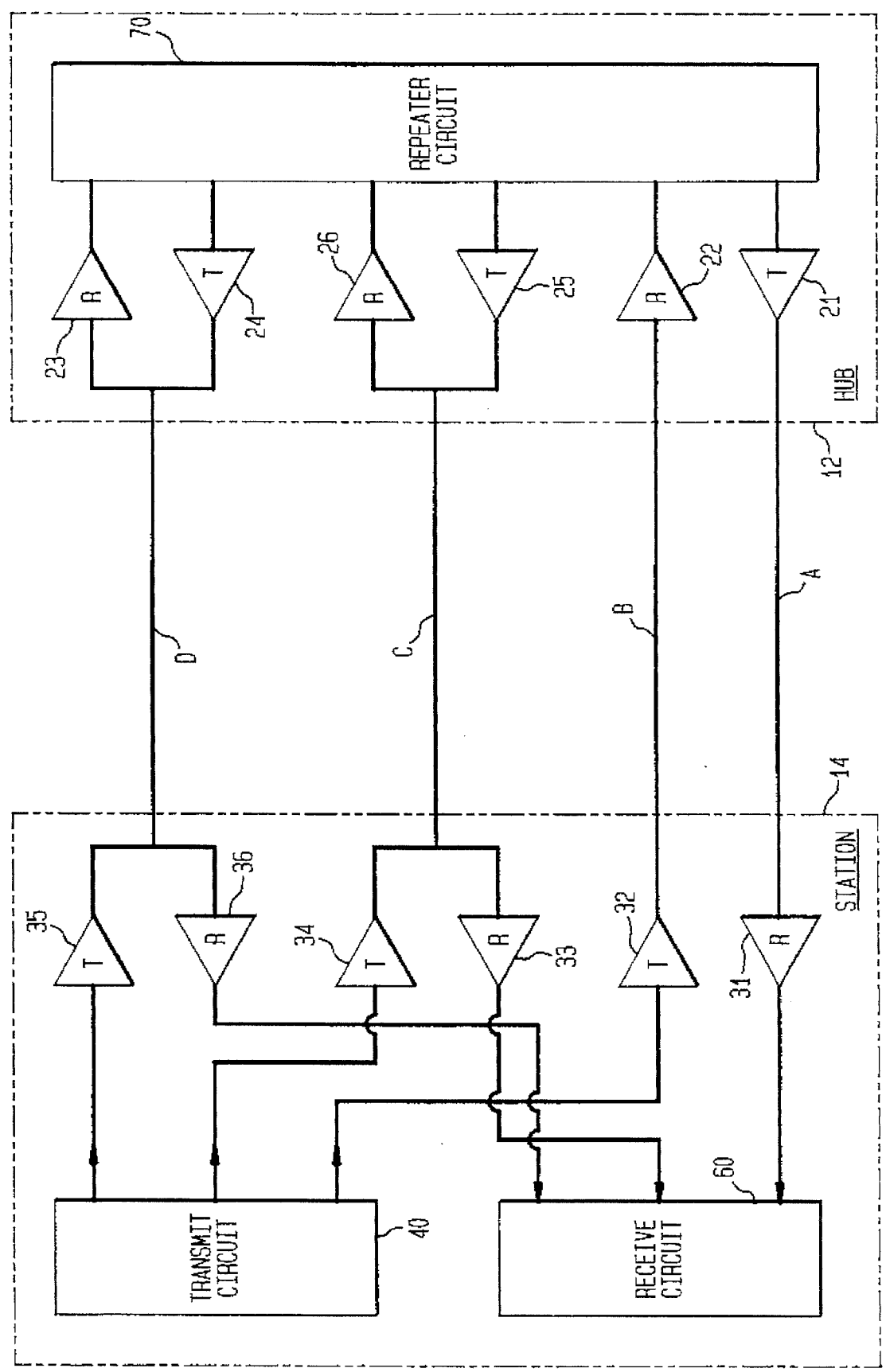
FIG. 2 schematically illustrates the connection between a station and the hub in the network of FIG. 1 in greater detail, in accordance with an illustrative embodiment of the invention.

The connection between a station 14 and hub 12 including the four unshielded twisted pairs A, B, C, D is illustrated in greater detail in FIG. 2.

The pair A is transmit only for the hub 12 and receive only for the station 14. Thus, in the hub 12 there is only a transmitter (T) 21 connected to the pair A. In the station 14, only the receiver (R) 31 is connected to the pair A.

The pair B is transmit only for the station 14 and receive only for the hub 12. Thus, in the station 14, only the transmitter 32 is connected to the pair B. In the hub 12 only the receiver 22 is connected to the pair B.

The pair C and the pair D can transmit data in either direction. In the station 14, the transmitter 34 and the receiver 33 are connected to the pair C. In the hub 12, the receiver 26 and the transmitter 25 are connected to the pair C. In the station 14, the transmitter 35 and the receiver 36 are connected to the pair D. In the hub 12, the receiver 23 and the transmitter 24 are connected to the pair D.

In accordance with the present invention, when the station 14 is transmitting to the hub 12, pairs B, C, and D are used and pair A, which is receive only for the station 14, is idle. When the hub 12 is transmitting to the station 14, pairs A, C and D are used and pair B, which is receive only for the hub, is idle. A collision occurs when the hub and the station transmit at the same time. Pairs A and B are used to detect such collisions in a manner described in detail below.

In the station 14, the receivers 31, 33 and 36 are connected to a receive circuit 60 and the transmitters 32, 34 and 35 are connected to a transmit circuit 40. In the hub 12, the receivers 22, 23 and 26 and the transmitters 21, 24 and 25 are connected to a repeater circuit 70.

Figure 3:
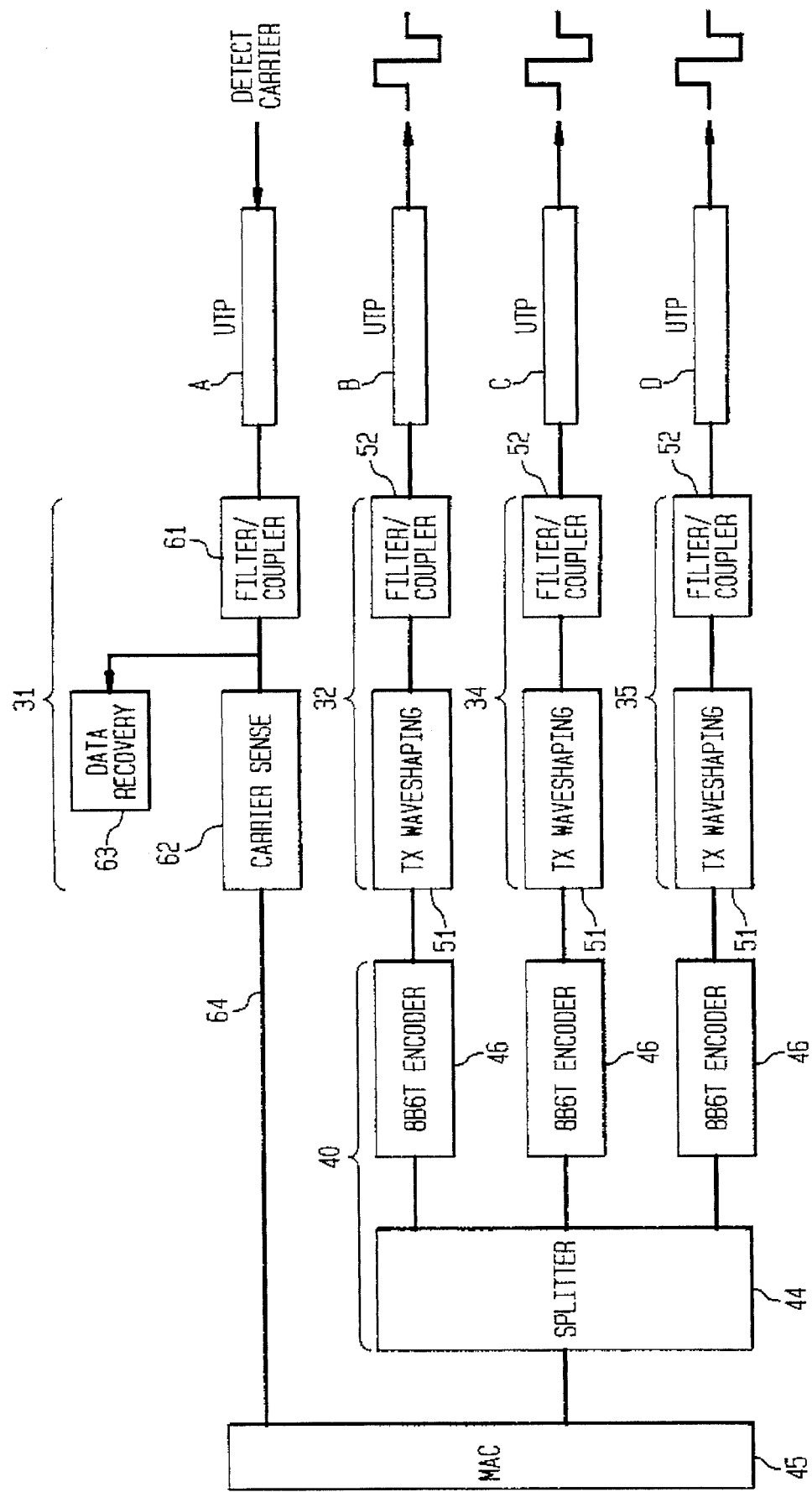
FIG. 3 illustrates data transmitting circuitry for use in the stations of FIG. 1 and FIG. 2.

The circuitry used at the station 14 to transmit data and to detect collisions is shown in greater detail in FIG. 3. As indicated above in connection with FIG. 2, the station 14 includes a transmit circuit 40. The transmit circuit 40 comprises a splitter 44 and three 8B/6T encoders 46. The splitter 44 receives a serial bitstream input from a Media Access Controller (MAC) 45. The splitter 44 has three outputs which are each connected to one of the 8B/6T encoders 46. In 8B/6T coding, eight binary bits are converted to six ternary symbols. (A binary bit takes on one of two logic levels, a ternary symbol takes on one of three logic levels). Techniques and circuits for converting between a certain number of binary bits and a certain number of ternary symbols are well known. There is one 8B/6T encoder 46 connected to each of the transmitters 32, 34 and 35. The transmitters 32, 34 and 35 are in turn connected to the unshielded twisted pairs (UTP's) B, C, and D, respectively. Each of the transmitters 32, 34, and 35 comprises a waveshaping circuit 51 and a filter/coupler 52 which low pass filters the output signal of the waveshaping-circuit and couples this signal to the corresponding unshielded twisted pair. The MAC 45 is a scaled MAC which illustratively operates at 100 Mbps. This MAC has an effective data rate which is ten times that of a conventional MAC used in a 10 base T Ethernet. The MAC 45 may be implemented using a conventional 10 base T MAC with a clock rate increased by a factor of ten or by using additional parallel processing.

A data frame is processed by the circuitry of FIG. 3 as follows. A data frame contains 64 to 1518 bytes. When put in serial form, a data frame comprises 512 to 12144 bits. This serial bit stream is inputted to the splitter 44 from the MAC 45. The serial bit stream for each frame outputted by the MAC 45 is split into three packets by the splitter 44. Each packet comprises between 175 and 4053 bits. Each packet is then transmitted to one of the encoders 46 which performs 8B/6T coding. Thus, the output of each encoder 46 is a packet comprised of 132 to 3042 ternary symbols. Each packet of ternary symbols produced by one of the encoders 46 is then transmitted by a corresponding transmitter 32, 34 or 35 on one of pairs B, C, or D to the hub.

The pair A is receive only for the hub. As shown in FIG. 3, the receiver 31 connected to the pair A comprises a filter/coupler 61 for low pass filtering a signal arriving via the twisted pair A and for coupling this signal to a carrier sense circuit 62 and a data recovery circuit 63. The data recovery circuit 63 is discussed in greater detail below in connection with FIG. 4. The carrier sense circuit 62 operates as follows. The carrier sense circuit 62 outputs an indication signal on line 64 when it detects the start of a carrier on the twisted pair A. This indication signal is transmitted to the MAC 45. If the MAC 45 receives the indication signal while data is being transmitted on twisted pairs B, C, and D, a collision is detected. As is discussed below, when the MAC 45 detects a collision, it goes into a jam mode in which a jam signal is transmitted via the transmit only pair B to the hub.

Figure 4:
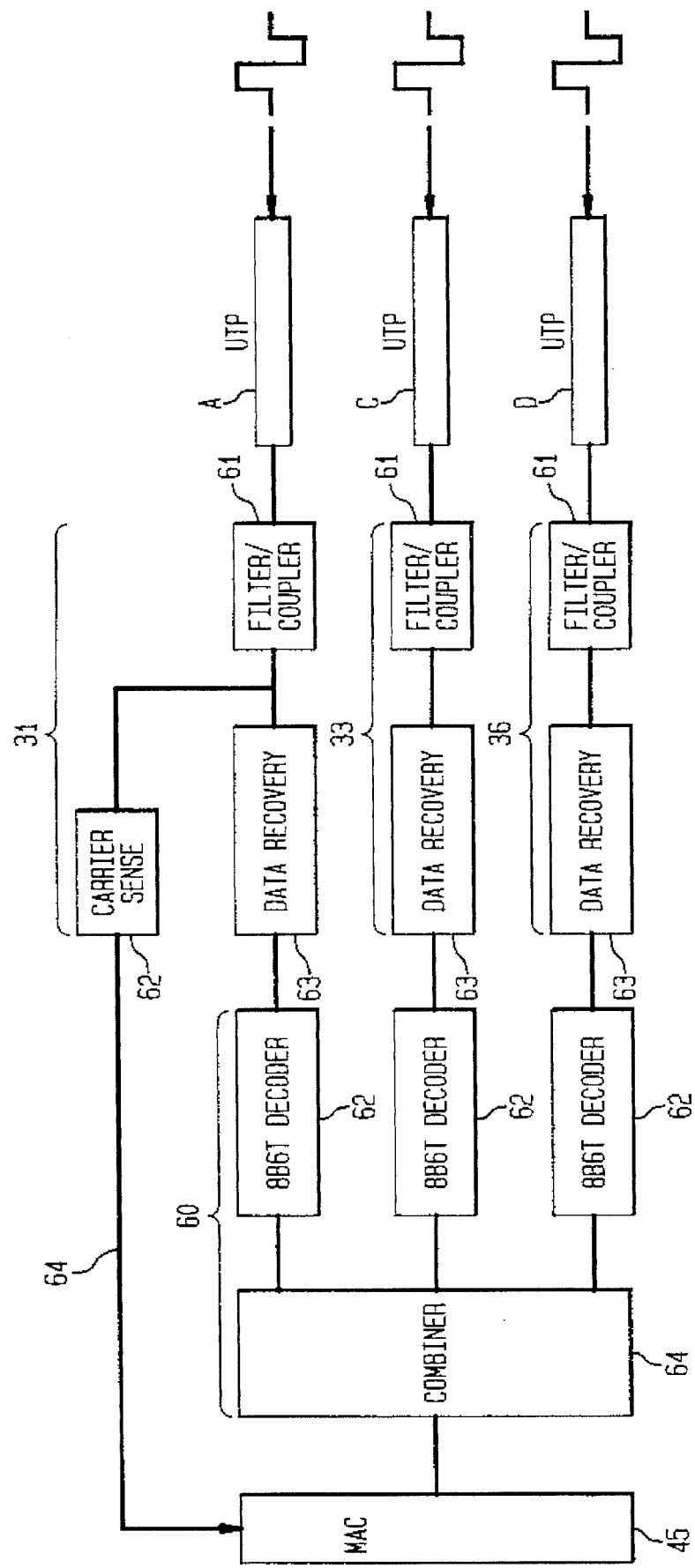
FIG. 4 illustrates data receiving circuitry for use in the stations of FIG. 1 and FIG. 2.

The circuitry used to receive data from the hub at a station is illustrated in FIG. 4. Data arrives at the station from the hub in ternary form on pairs A, C, and D. This data is received at the receivers 31, 33 and 36, respectively. Each receiver 31, 33, and 36 comprises a filter/coupler 61 and a data recovery circuit 63. The filter/coupler 61 low pass filters the signal received on the corresponding twisted pair and couples this signal to the associated data recovery circuit 63. The data recovery circuit 63 comprises a phase locked loop for synchronizing a local clock with the data stream received from the hub and a channel equalizer. As indicated above, the receiver 31 also includes a carrier sense circuit for collision detection.

The receivers 31, 33, and 36 are connected to a receive circuit 60 (see FIG. 2). As shown in FIG. 4, the receive circuit 60 comprises the three 6T/8B decoders 62. The three decoders 62 receive three data packets comprised of ternary symbols from the data recovery circuits 63 of the corresponding receivers 31, 33, and 36. The packets are converted from ternary form back to binary form using the 6T/8B (six ternary symbols to eight binary bits) decoders 62. Techniques and circuits for converting between a certain number ternary symbols and a certain number of binary bits are well known in the art. The data packets emerging from the decoders 62, which packets now comprise binary bits, are combined into a single serial bit stream by the combiner 64 and transmitted to the MAC 45.

The repeater circuit 70 of the hub 14 (see FIG. 2) is now considered in greater detail. Data in ternary form received from a particular station 14 on pairs B, C, D at a particular repeater circuit 70 is transmitted through the hub to the repeater circuits associated with the other stations connected to the hub. This data is then transmitted by these repeater circuits to the other stations in ternary form on pairs A, C, D. When a repeater circuit 70 receives data from its associated station on its receive only pair (pair B) at the same time it is transmitting to its associated station (on pairs A, C, and D), a collision is detected.

The collision detection algorithm used by the hub 12 and the stations 14 (see FIG. 1 and FIG. 2) is now considered in greater detail. Each station 14 detects the start of a collision on its receive only pair A by detecting the presence of energy (e.g. by using the carrier sense circuit 62 of the receiver 31) while the station is transmitting on pairs B, C, and D. As indicated above, the hub 12 detects the start of a collision using its receive only pair B by detecting the presence of energy while the hub is transmitting on pairs A, C, and D.

After detecting the start of a collision, the MAC 45 (see FIG. 3 and FIG. 4) causes the station 14 to send a jam signal for a specific time period (e.g. 300 nanoseconds) on the station's transmit only pair B.

When a particular repeater circuit 70 in the hub detects a collision with a particular station, an indication thereof is transmitted to the repeater circuits associated with all other stations connected to the hub. The hub 12 then sends a jam signal on all of the transmit only pairs A to all of the stations 14 (see FIG. 1). The hub keeps sending the jam signal to all the stations until the hub receives no energy on all of its receive only pairs B. Transmissions between the stations and the hub then begin again in accordance with the conventional exponential backoff algorithm.

Figure 5:
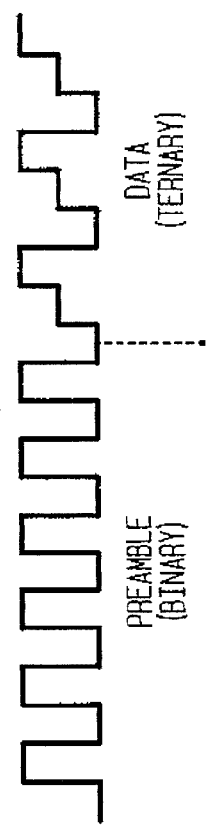
FIG. 5 illustrates a binary preamble and ternary data transmitted between the hub and stations in accordance with the present invention.

In order to facilitate collision detection, each packet of ternary data symbols may be preceded by a binary preamble as shown in FIG. 5. The binary preamble contains a specific code which distinguishes the preamble from noise. The binary preamble is used because two-level binary signals have a higher signal-to-noise ratio than three level ternary symbols for the same transmit amplitude and are easier to detect by a carrier sense circuit (such as carrier sense circuit 62 of FIG. 3 and FIG. 4).

It should be noted that it is not necessary for the preamble of FIG. 5 to be a low frequency preamble because separation of a low frequency preamble from a high frequency data signal is not used to detect a collision.

In short, a fast Ethernet has been disclosed. Each station is connected to the hub by a first pair which transmits unidirectionally from the station to the hub, a second pair which transmits unidirectionally from the hub to the station, and one or more bidirectional pairs. The unidirectional pairs are used for collision detection using a CSMA/CD technique.

Finally, the above described embodiments of the invention are intended to be illustrative only. Numerous alternative embodiments may be devised by those skilled in the art without departing from the spirit and scope of the following claims.

We claim:

1. A network comprising:

a central hub, and a station connected to the hub, said station being connected to the hub by a first distinct unidirectional transmission path for transmitting data only from the station to the hub, a second distinct unidirectional transmission path for transmitting data only from the hub to the station, and one or more distinct bidirectional transmission paths for transmitting data from the station to the hub and from the hub to the station, said station transmitting data to the hub simultaneously on the first unidirectional transmission path and the one or more bidirectional transmission paths and detecting a start of a collision with the hub when the station detects a presence of energy transmitted from the hub on the second unidirectional transmission path while the station is transmitting data simultaneously on the first unidirectional transmission path and on said one or more bidirectional transmission paths, said hub transmitting data to the hub simultaneously on the second unidirectional transmission path and the one or more bidirectional transmission paths and detecting a start of a collision with the station when the hub detects a presence of energy transmitted from the station on the first unidirectional transmission path while the hub is transmitting data simultaneously on the second unidirectional transmission path and on said one or more bidirectional transmission paths.

2. The network of claim 1 wherein each of said transmission paths comprises an unshielded twisted pair.

3. The network of claim 2 wherein said network comprises two bidirectional transmission paths.

4. In a network comprising a hub and a plurality of stations connected to the hub, wherein each station is connected to the hub by a first distinct unidirectional transmission path for transmitting data only from the station to the hub, a second distinct unidirectional transmission path for transmitting data only from the hub to the station and at least one distinct bidirectional transmission path for transmitting data from the station to the hub and from the hub to the station, a method for detecting collisions comprising the steps of:

detecting a start of a collision with the hub by a particular station by sensing at the station a presence of energy transmitted from the hub on the second unidirectional transmission path between the particular station and the hub while the particular station is transmitting data to the hub on the first unidirectional transmission path between the hub and the particular station and on the at least one bidirectional transmission path between the hub and the particular station, transmitting a jam signal from the particular station to the hub on the first unidirectional transmission path for a predetermined time period, detecting a start of a collision with the particular station by said hub by sensing at the hub a presence of energy transmitted from the particular station on the first unidirectional transmission path between the particular station and the hub while the hub is transmitting data to the particular station on the second unidirectional transmission path and on the at least one bidirectional transmission path between the hub and the particular station, and transmitting a jam signal by the hub to each of said stations via the second unidirectional path connecting the hub to each station until the hub senses no energy on the first unidirectional transmission path from any of the stations.

5. A circuit located at a station for interfacing said station to a hub in a network comprising first and second data receivers, and first and second data transmitters, said first transmitter being connected to a first unidirectional transmission path between said hub and said station for transmitting data unidirectionally only from said station to said hub, said first receiver being connected to a second unidirectional transmission path between said hub and said station for receiving data transmitted unidirectionally only from said hub to said station, said second receiver and said second transmitter being connected to a first bidirectional transmission path between said hub and said station for receiving data transmitted from said hub and transmitting data to said hub, said interfacing circuit further including a circuit for indicating the presence of energy on said second unidirectional transmission path while data is being transmitted from said station to said hub simultaneously on said first unidirectional transmission path and first bidirectional transmission path.

6. The interfacing circuit of claim 5 further comprising:

a third data receiver and a third data transmitter, said third receiver and said third transmitter being connected to a second bidirectional transmission path between said hub and said station for receiving data transmitted from said hub and transmitting data to said hub.

7. A circuit located at a hub for interfacing said hub to a station in a network comprising first and second data transmitters, and first and second data receivers, said first receiver being connected to a first unidirectional transmission path between said hub and said station for receiving data transmitted unidirectionally only from said station to said hub, said first transmitter being connected to a second unidirectional transmission path between said hub and said station for transmitting data unidirectionally only from said hub to said station, said second receiver and said second transmitter being connected to a first bidirectional transmission path between said hub and said station for receiving data transmitted from said station and transmitting data to said station, said interfacing circuit further including a circuit for indicating the presence of energy on said first unidirectional transmission path while data is being transmitted from said hub to said station simultaneously on said second unidirectional transmission path and first bidirectional transmission paths.

8. The interfacing circuit of claim 7 further comprising:

a third data receiver and a third data transmitter, said third receiver and said third transmitter being connected to a second bidirectional transmission path between said hub and said station for receiving said data transmitted from said station and transmitting data to said station.

* * * * *